(12) United States Patent
Peters

(10) Patent No.: US 10,086,465 B2
(45) Date of Patent: Oct. 2, 2018

(54) TANDEM HOT-WIRE SYSTEMS

(71) Applicant: Lincoln Global, Inc., City of Industry, CA (US)

(72) Inventor: Steven R Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1325 days.

(21) Appl. No.: 13/834,485

(22) Filed: Mar. 15, 2013

(65) Prior Publication Data

US 2014/0263230 A1    Sep. 18, 2014

(51) Int. Cl.
  *B23K 9/20*   (2006.01)
  *B23K 9/173*  (2006.01)
  *B23K 9/10*   (2006.01)
  *B23K 9/09*   (2006.01)

(52) U.S. Cl.
  CPC ............ *B23K 9/1006* (2013.01); *B23K 9/091* (2013.01); *B23K 9/1043* (2013.01); *B23K 9/173* (2013.01)

(58) Field of Classification Search
  None
  See application file for complete search history.

(56) References Cited

U.S. PATENT DOCUMENTS

| | | | |
|---|---|---|---|
| 1,740,381 A | 12/1929 | Weed | |
| 1,792,243 A | 2/1931 | Richter | |
| 1,854,536 A | 4/1932 | Wilson | |
| 2,694,129 A | 11/1954 | Yenni | |
| 2,702,846 A | 2/1955 | Breymeier | |
| 2,743,342 A | 4/1956 | Bettis et al. | |
| 2,756,311 A * | 7/1956 | Persson | B23K 9/0737 219/123 |
| 2,773,969 A | 12/1956 | Gunther | |
| 2,820,183 A | 1/1958 | Ander | |
| 2,844,705 A | 7/1958 | Bowman et al. | |

(Continued)

FOREIGN PATENT DOCUMENTS

| | | |
|---|---|---|
| CN | 101032778 A | 9/2007 |
| CN | 102133679 A | 7/2011 |

(Continued)

OTHER PUBLICATIONS

U.S. Appl. No. 13/438,703, filed Apr. 3, 2012, Synchronized Magnetic Arc Steering and Welding.

(Continued)

*Primary Examiner* — Ibrahime A Abraham
*Assistant Examiner* — Gyounghyun Bae
(74) *Attorney, Agent, or Firm* — Perkins Coie LLP

(57) ABSTRACT

A system and method is provided. The system includes a first power supply that outputs a welding current that includes welding pulse currents and a background welding current. The system also includes a second power supply that outputs a heating current that includes first heating pulse currents at a first polarity and second heating pulse currents at an opposite polarity. The system also includes a controller that synchronizes at least one of the first heating pulse currents and the second heating pulse currents with at least one of the welding pulse currents and the background current to influence a position of an arc relative to a molten puddle based on magnetic fields created by the welding current and the heating current.

13 Claims, 10 Drawing Sheets

(56) References Cited

U.S. PATENT DOCUMENTS

| | | | |
|---|---|---|---|
| 2,920,183 A | 1/1960 | Greene | |
| 2,994,763 A | 8/1961 | Schultz | |
| 3,102,946 A | 9/1963 | Zygmunt | |
| 3,174,027 A | 3/1965 | Manz | |
| 3,274,371 A * | 9/1966 | Saenger, Jr. | B23K 9/04 219/137 R |
| 3,433,924 A | 3/1969 | Sevenco | |
| 3,483,354 A * | 12/1969 | Saenger, Jr. | B23K 9/167 219/137 PS |
| 3,549,856 A * | 12/1970 | Saenger, Jr. | B23K 9/0737 219/123 |
| 3,551,637 A | 12/1970 | Lampson | |
| 3,602,683 A | 8/1971 | Hishida et al. | |
| 3,626,145 A | 12/1971 | Jackson | |
| 3,627,974 A * | 12/1971 | Normando | B23K 9/091 219/130.51 |
| 3,727,822 A | 4/1973 | Umbaugh | |
| 3,757,079 A * | 9/1973 | Blomgren, Sr. | B23K 9/04 219/137 R |
| 3,825,712 A * | 7/1974 | Gibbs | B23K 9/08 219/123 |
| 3,851,139 A * | 11/1974 | Rudd | B21D 26/14 219/101 |
| 3,885,123 A * | 5/1975 | Sciaky | B23K 9/08 219/123 |
| 3,956,610 A | 5/1976 | Kanbe et al. | |
| 3,978,311 A | 8/1976 | Toth | |
| 4,019,011 A | 4/1977 | Cape | |
| 4,019,016 A | 4/1977 | Friedman et al. | |
| 4,027,135 A | 5/1977 | Barger | |
| 4,048,436 A | 9/1977 | Hiratake et al. | |
| 4,095,077 A * | 6/1978 | Schneider | B23K 9/10 219/125.12 |
| 4,095,085 A | 6/1978 | Tomita et al. | |
| 4,119,828 A * | 10/1978 | Bykhovsky | B23K 10/02 219/121.46 |
| 4,145,593 A * | 3/1979 | Merrick | B23K 9/0286 219/125.11 |
| 4,169,962 A | 10/1979 | Hiratake et al. | |
| 4,190,760 A | 2/1980 | Kano et al. | |
| 4,194,106 A | 3/1980 | Rudaz et al. | |
| 4,215,299 A | 7/1980 | Edwin et al. | |
| 4,280,137 A | 7/1981 | Ashida et al. | |
| 4,301,355 A | 11/1981 | Kimbrough et al. | |
| 4,326,155 A | 4/1982 | Griebeler | |
| 4,336,441 A * | 6/1982 | Godai | B23K 9/23 219/123 |
| 4,341,944 A * | 7/1982 | Breen | B23K 9/1675 219/123 |
| 4,366,362 A * | 12/1982 | Ohta | B23K 9/167 219/123 |
| 4,408,114 A | 10/1983 | Nakata et al. | |
| 4,409,465 A | 10/1983 | Yamamoto et al. | |
| 4,417,126 A | 11/1983 | Kasahara et al. | |
| 4,456,814 A * | 6/1984 | Mizuno | B23K 9/073 219/130.32 |
| 4,485,292 A * | 11/1984 | Mizuno | B23K 9/091 219/123 |
| 4,491,718 A | 1/1985 | Cook et al. | |
| 4,507,541 A | 3/1985 | Fourre et al. | |
| 4,511,784 A * | 4/1985 | Miyamori | B23K 9/08 219/100 |
| 4,532,409 A * | 7/1985 | Ogata | B23K 9/167 219/125.12 |
| 4,544,826 A * | 10/1985 | Nakanishi | B23K 9/10 219/123 |
| 4,547,654 A * | 10/1985 | Stol | B23K 9/1093 219/136 |
| 4,580,026 A | 4/1986 | Stol | |
| 4,595,820 A | 6/1986 | Richardson | |
| 4,614,856 A | 9/1986 | Hori et al. | |
| 4,628,182 A * | 12/1986 | Hori | B23K 9/124 219/130.33 |
| 4,714,818 A | 12/1987 | Mazac | |
| 4,791,270 A | 12/1988 | Nelson et al. | |
| 4,904,843 A * | 2/1990 | Hori | B23K 9/1093 219/130.51 |
| 4,975,558 A | 12/1990 | Lukens et al. | |
| 4,990,743 A | 2/1991 | Kugai et al. | |
| 5,040,125 A | 8/1991 | Okumura et al. | |
| 5,043,554 A * | 8/1991 | Kohsaka | B23K 10/006 219/121.39 |
| 5,130,514 A | 7/1992 | Kugai et al. | |
| 5,171,966 A | 12/1992 | Fukuoka et al. | |
| 5,206,474 A | 4/1993 | Fukuoka et al. | |
| 5,233,158 A | 8/1993 | Karakama et al. | |
| 5,278,390 A | 1/1994 | Blankenship | |
| 5,406,052 A | 4/1995 | Mizuno et al. | |
| 5,473,139 A * | 12/1995 | Matsui | B23K 9/092 219/130.51 |
| 5,508,493 A * | 4/1996 | Ueyama | B23K 9/091 219/130.51 |
| 5,932,121 A * | 8/1999 | Manabe | B23K 9/08 219/123 |
| 6,023,043 A * | 2/2000 | Manabe | B23K 9/08 219/123 |
| 6,037,554 A * | 3/2000 | Innami | B23K 9/092 219/130.21 |
| 6,207,927 B1 | 3/2001 | Mita et al. | |
| 6,310,320 B1 | 10/2001 | Kraus et al. | |
| 6,331,694 B1 | 12/2001 | Blankenship | |
| 6,335,511 B1 | 1/2002 | Rothermel | |
| 6,337,455 B1 | 1/2002 | Yamaguchi | |
| 6,617,547 B1 | 9/2003 | Abdurachmanov et al. | |
| 6,621,049 B2 | 9/2003 | Suzuki et al. | |
| 6,657,163 B1 | 12/2003 | Blankenship et al. | |
| 6,800,832 B2 | 10/2004 | Hutchison et al. | |
| 6,884,959 B2 * | 4/2005 | Gandy | B23K 9/188 219/73.21 |
| 7,005,607 B2 | 2/2006 | Takatani et al. | |
| 7,041,937 B2 | 5/2006 | Ihde et al. | |
| 7,307,240 B2 | 12/2007 | Holverson et al. | |
| 7,378,612 B2 | 5/2008 | Takahashi et al. | |
| 7,842,904 B2 | 11/2010 | Nakata et al. | |
| 9,044,817 B2 | 6/2015 | Fukunaga et al. | |
| 2002/0117489 A1* | 8/2002 | Arndt | B23K 9/0953 219/130.5 |
| 2003/0024916 A1 | 2/2003 | Wright et al. | |
| 2004/0118826 A1 | 6/2004 | Schmitt et al. | |
| 2005/0199593 A1 | 9/2005 | Ignatchenko et al. | |
| 2005/0269306 A1 | 12/2005 | Fulmer et al. | |
| 2006/0237409 A1 | 10/2006 | Uecker et al. | |
| 2007/0056942 A1 | 3/2007 | Daniel et al. | |
| 2007/0158324 A1 | 7/2007 | O'Donnell | |
| 2007/0210048 A1 | 9/2007 | Koshiishi et al. | |
| 2007/0241087 A1 | 10/2007 | Peters | |
| 2007/0262058 A1 | 11/2007 | Ulrich et al. | |
| 2008/0011727 A1* | 1/2008 | Peters | B23K 9/025 219/130.5 |
| 2008/0053978 A1 | 3/2008 | Peters et al. | |
| 2008/0156782 A1 | 7/2008 | Rice et al. | |
| 2008/0206594 A1 | 8/2008 | Fukuda et al. | |
| 2008/0230528 A1 | 9/2008 | Wilhelm | |
| 2009/0242533 A1 | 10/2009 | Yamazaki et al. | |
| 2010/0059485 A1* | 3/2010 | Hutchison | B23K 9/04 219/74 |
| 2010/0096373 A1 | 4/2010 | Hillen et al. | |
| 2010/0096375 A1 | 4/2010 | Daniel et al. | |
| 2010/0200553 A1 | 8/2010 | Yamazaki et al. | |
| 2010/0213179 A1* | 8/2010 | Peters | B23K 26/0676 219/121.64 |
| 2010/0230389 A1 | 9/2010 | Hsu et al. | |
| 2011/0132877 A1 | 6/2011 | Miller et al. | |
| 2011/0174784 A1 | 7/2011 | Kamei et al. | |
| 2011/0259853 A1* | 10/2011 | Yamazaki | B23K 9/092 219/74 |
| 2011/0290771 A1 | 12/2011 | Fukunaga et al. | |
| 2012/0312795 A1 | 12/2012 | Suzuki et al. | |
| 2013/0043219 A1* | 2/2013 | Peters | B23K 35/0261 219/72 |
| 2013/0112675 A1 | 5/2013 | Peters et al. | |

(56) References Cited

U.S. PATENT DOCUMENTS

| | | | |
|---|---|---|---|
| 2013/0125685 A1 | 5/2013 | Miller et al. | |
| 2013/0193115 A1* | 8/2013 | Berg | B23K 9/122 219/74 |
| 2013/0228555 A1 | 9/2013 | Peters et al. | |
| 2013/0256288 A1 | 10/2013 | Matthews et al. | |
| 2014/0001166 A1 | 1/2014 | Peters et al. | |
| 2015/0129560 A1 | 5/2015 | Muramatsu et al. | |
| 2015/0379894 A1 | 12/2015 | Becker et al. | |

FOREIGN PATENT DOCUMENTS

| | | | |
|---|---|---|---|
| CN | 102186618 A | | 9/2011 |
| DE | 102007017225 A1 | | 9/2008 |
| JP | 57-39077 A | | 3/1982 |
| JP | 58-205680 A | | 11/1983 |
| JP | 59-87981 A | | 5/1984 |
| JP | 59223168 A | * | 12/1984 |
| JP | 63-192562 A | | 8/1988 |
| JP | 2-59179 A | | 2/1990 |
| JP | 10-193116 A | | 7/1998 |
| JP | 11-291038 A | | 10/1999 |
| JP | 2011098375 A | | 5/2011 |
| SU | 538842 A1 | | 12/1976 |
| SU | 1637971 A1 | | 3/1991 |
| WO | WO 2013/150364 A1 | | 10/2013 |

OTHER PUBLICATIONS

U.S. Appl. No. 13/792,416, filed Mar. 11, 2013, Auto Steering in a Weld Joint.
U.S. Appl. No. 13/834,179, filed Mar. 15, 2013, Tandem Hot-Wire Systems.
Henon, Barbara K. et al., "Automated Narrow Gap GTAW—Driving Down the Cost of Energy," Arc Machines, Inc., 3 pages, prior to Jun. 27, 2012.
International Application No. PCT/IB2013/001365, International Search Report & Written Opinion, 11 pages, Dec. 17, 2013.
International Application No. PCT/IB2013/001384, International Search Report & Written Opinion, 9 pages, Nov. 26, 2013.
U.S. Appl. No. 13/792,822, filed Mar. 11, 2013, Parallel State-Based Controller for a Welding Power Supply.
International Application No. PCT/IB2013/000583, International Search Report & Written Opinion, 9 pages, Sep. 20, 2013.
International Application No. PCT/IB2014/000283, International Search Report, 5 pages, Sep. 4, 2014.
International Application No. PCT/IB2014/000376, International Search Report & Written Opinion, 9 pages, Sep. 24, 2014.
International Application No. PCT/IB2014/000383, International Search Report & Written Opinion, 9 pages, Sep. 24, 2014.
Schnick, et al. "Three-dimensional modeling of arc behavior and gas shield quality in tandem gas-metal arc welding using anti-phase pulse synchronization," Journal of Physics D: Applied Physics, 44 (2011) 185205, 11 pages.

* cited by examiner

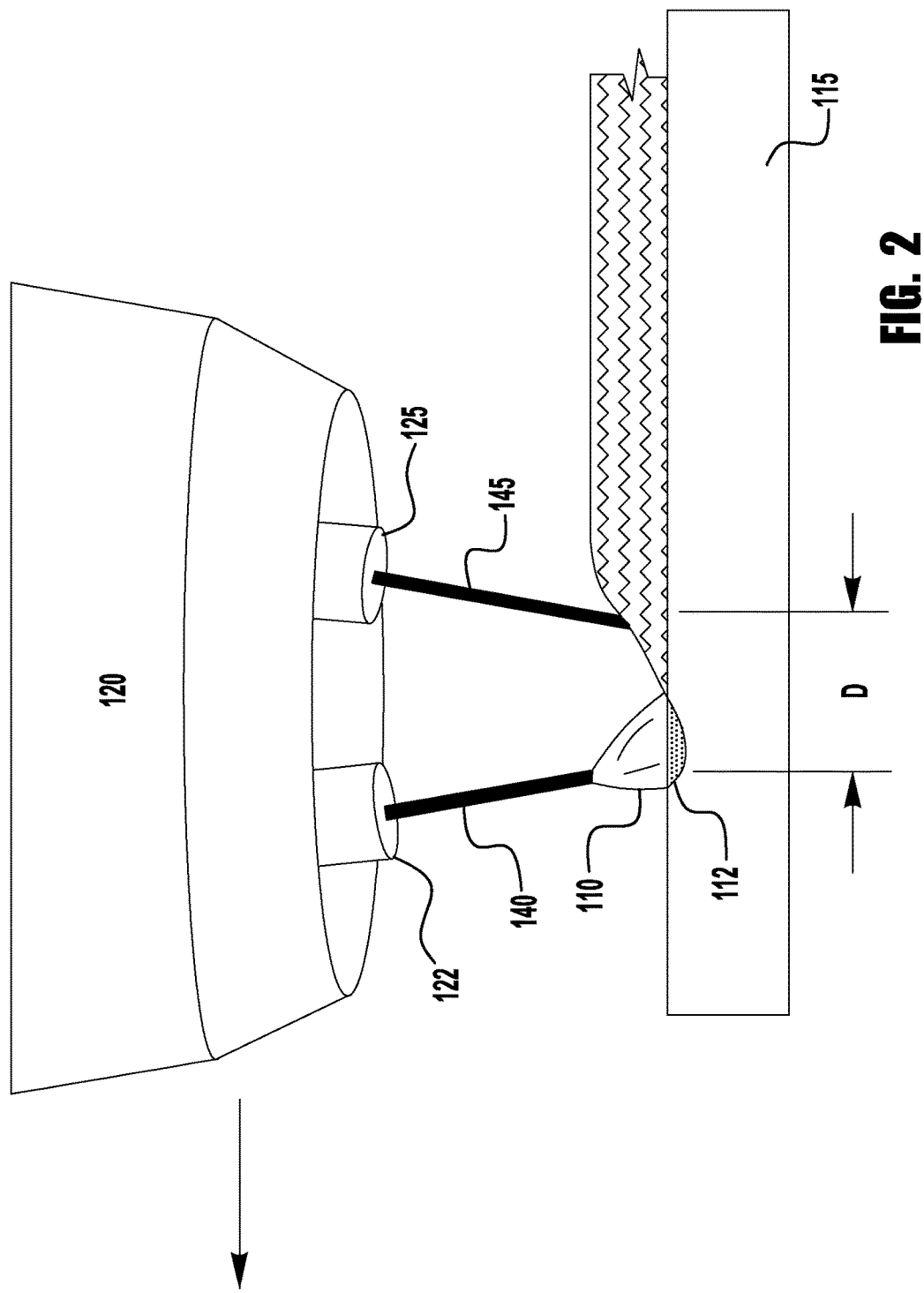

TANDEM HOT-WIRE SYSTEMS

BACKGROUND OF THE INVENTION

Field of the Invention

Systems and methods of the present invention relate to welding and joining, and more specifically to tandem hot-wire systems.

Description of the Related Art

As advancements in welding have occurred, the demands on welding throughput have increased. Because of this, various systems have been developed to increase the speed of welding operations, including systems which use multiple welding power supplies in which one power supply is used to create an arc in a consumable electrode to forma weld puddle and a second power supply is used to heat a filler wire in the same welding operation. While these systems can increase the speed or deposition rate of a welding operation, the different currents created by the multiple power supplies can interfere with each other causing arc blow and other problems during welding. In addition, these power supplies are not synchronized in order to optimize the process, e.g., welding, joining, cladding, building-up, brazing, etc. Thus, improved systems are desired.

BRIEF SUMMARY OF THE INVENTION

Exemplary embodiments of the present invention include systems and methods in which heating currents are synchronized with welding currents to influence a position of an arc relative to a molten puddle. In some exemplary embodiments, the system includes a first power supply that outputs a welding current that includes welding pulse currents and a background welding current. The first power supply provides the welding current via a torch to a first wire to create an arc between the first wire and the workpiece. The arc creates a molten puddle on the workpiece. The system also includes a first wire feeder that feeds the first wire to the torch and a second wire feeder that feeds a second wire to the molten puddle via a contact tube. The system further includes a second power supply that outputs a heating current that includes first heating pulse currents at a first polarity and second heating pulse currents at an opposite polarity. The second power supply provides the heating current to the second wire via the contact tube. The system additionally includes a controller that synchronizes at least one of the first heating pulse currents and the second heating pulse currents with at least one of the welding pulse currents and the background current to influence a position of the arc relative to the molten puddle based on magnetic fields created by said welding current and said heating current.

In some exemplary embodiments, the system includes a first power supply that outputs a welding current that includes welding pulse currents and a background welding current. The first power supply provides the welding current via a torch to a first wire to create an arc between the first wire and the workpiece. The system also includes a first wire feeder that feeds the first wire to the torch, and a second wire feeder that feeds a second wire to a molten puddle via a contact tube. The system further includes a second power supply that outputs a heating current that includes first heating pulse currents at a first polarity and second heating pulse currents at a polarity that is opposite that of the first polarity. The second power supply provides the heating current to the second wire via the contact tube. The system additionally includes a controller that synchronizes at least one of the first heating pulse currents and the second heating pulse currents with at least one of the welding pulse currents and the background current to influence a position of the arc relative to the molten puddle based on magnetic fields created by the welding current and the heating current. The controller also includes a balance control that adjusts a duration of the first heating pulse currents relative to the second heating pulse currents. The controller can also include an offset control that adjusts an amplitude of the first heating pulse currents relative to the second heating pulse currents, and a dead time control that adjusts a first dead time of a transition from the first heating pulse currents to the second heating pulse currents relative to a second dead time of a transition from the second heating pulse currents to the first heating pulse currents.

In some embodiments, the system includes a first wire feeder that feeds a first wire to a torch and a first power supply that outputs a welding current to the first wire via the torch. The welding current including a first current segment that is output when the first wire is in contact with a workpiece and that melts a portion of the first wire. The welding current also has a second current segment that is output when the portion from the first wire has transferred to the workpiece and an arc is created between the first wire and the workpiece. The system also includes a second wire feeder that feeds a second wire to the molten puddle via a contact tube, and a second power supply that outputs a heating current that includes first heating pulse currents at a first polarity and second heating pulse currents at a polarity that is opposite that of said first polarity. The second power supply provides the heating current to the second wire via the contact tube. The system further includes a controller that performs at least one of a first synchronization and a second synchronization. The first synchronization includes synchronizing at least one of the first heating pulse currents and the second heating pulse currents with the second current segment to influence a position of the arc relative to the molten puddle based on magnetic fields created by the welding current and the heating current. The second synchronization includes synchronizing at least one of the first heating pulse currents and the second heating pulse currents with the first current segment to influence the transfer of the portion from the first wire.

In some embodiments, the system includes a first power supply that outputs a welding current that includes welding pulse currents and a background welding current. The first power supply provides the welding current via a torch to a first wire to create an arc between the first wire and the workpiece. The system also includes a first wire feeder that feeds the first wire to the torch, and a second wire feeder that feeds a second wire to the molten puddle via a contact tube. The system further includes a second power supply that outputs a heating current that includes heating pulse currents and a background heating current. The second power supply provides the heating current to the second wire via the contact tube. The system additionally includes a controller that synchronizes at least one of said heating pulse currents and said background heating current with at least one of the welding pulse currents and the background current to influence a position of the arc relative to the molten puddle based on magnetic fields created by the welding current the said heating current. The controller also includes a background current controller that adjusts a value of the background heating current, and automatically changes a value of the heating pulse currents to maintain a preset average value for the heating current.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIG. 2 is an enlarged view of the area around the torch of the system of FIG. 1;

DETAILED DESCRIPTION OF EXEMPLARY EMBODIMENTS

Figure 1:
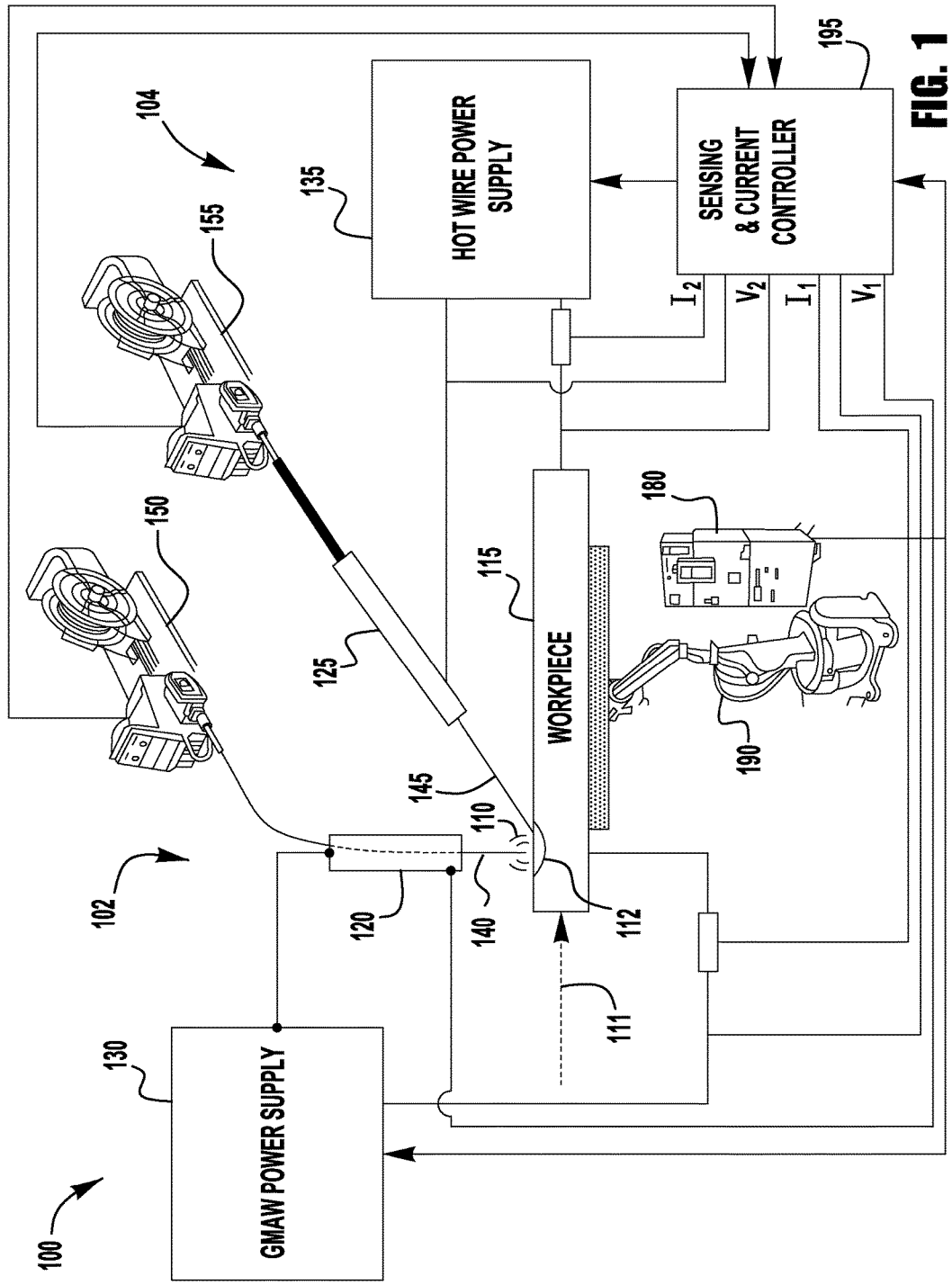
FIG. 1 is a diagrammatical representation of an exemplary embodiment of a welding system according to the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

An exemplary embodiment of this is shown in FIG. 1, which shows a system 100. The system 100 includes an arc welding system 102, such as a GMAW system, with a tandem hot wire system 104. The GMAW system 102 includes a power supply 130, a wire feeder 150, and a torch 120. The power supply 130 provides a welding waveform that creates an arc 110 between welding electrode 140 and workpiece 115. The welding electrode 140 is delivered to a molten puddle 112 created by the arc 110 via the wire feeder 150 and the torch 120. Along with creating the molten puddle 112, the arc 110 transfers droplets of the welding wire 140 to the molten puddle 112. The operation of a GMAW welding system of the type described herein is well known to those skilled in the art and need not be described in detail herein. It should be noted that although a GMAW system is shown and discussed regarding depicted exemplary embodiments with respect to joining/welding applications, exemplary embodiments of the present invention can also be used with TIG, Plasma, FCAW, MCAW, and SAW systems in applications involving joining/welding, cladding, building-up, brazing, and combinations of these, etc. Of course with TIG and Plasma systems, the welding electrode is not a consumable electrode. Not shown in FIG. 1 is a shielding gas system or sub arc flux system which can be used in accordance with known methods.

The hot wire system 104 includes a wire feeder 155 feeding a wire 145 to the weld puddle 112 via contact tube 125. The hot wire system 104 also includes a power supply 135 that resistance heats the wire 145 via contact tube 125 prior to the wire 145 entering the molten puddle 112. The power supply 135 heats the wire 145 to a desired temperature, e.g., to at or near a melting temperature of the wire 145. Thus, the hot wire system 104 adds an additional consumable to the molten puddle 112. The system 100 can also include a motion control subsystem that includes a motion controller 180 operatively connected to a robot 190. The motion controller 180 controls the motion of the robot 190. The robot 190 is operatively connected (e.g., mechanically secured) to the workpiece 115 to move the workpiece 115 in the direction 111 such that the torch 120 and the wire 145 effectively travel along the workpiece 115. Of course, the system 100 can be configured such that the torch 120 and the wire 145 can be moved instead of the workpiece 115.

As is generally known, arc generation systems, such as GMAW, use high levels of current to generate the arc 110 between the advancing welding consumable 140 and the molten puddle 112 on the workpiece 115. To accomplish this, many different welding current waveforms can be utilized, e.g., current waveforms such as constant current, pulse current, etc. However, during operation of the system 100, the current generated by the power supply 130 can interfere with the current generated by the power supply 135, which is used to heat the wire 145. Because the wire 145 is proximate to the arc 110 generated by the power supply 130 (because they are each directed to the same molten puddle 112), the respective currents of the power supplies can interfere with each other. Specifically, each of the currents generates a magnetic field, and those fields can interfere with each other and adversely affect the welding/joining operation. That is, the magnetic fields generated by the hot wire current by power supply 135 can interfere with the stability of the arc 110 generated by the power supply 130 and the efficiency of the welding/joining operation. However, by synchronizing the welding and hot wire current waveforms, these same magnetic fields can be controlled to stabilize the arc and/or to optimize the welding process.

Figure 5A:
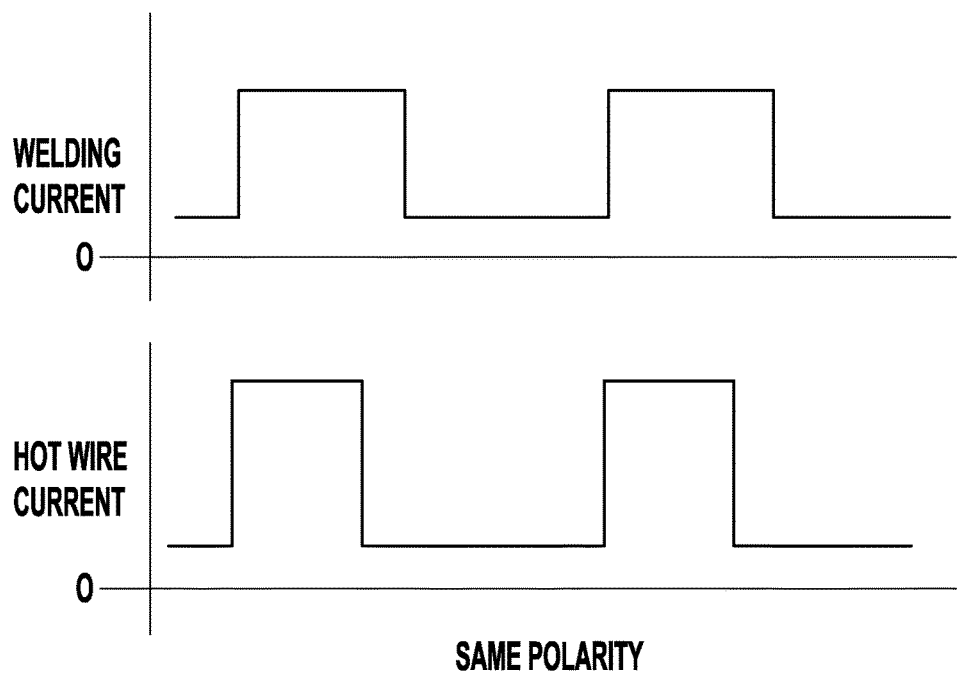
FIGS. 5A and 5B illustrate exemplary polarity alignments of exemplary welding and hot wire waveforms.
Figure 6A:
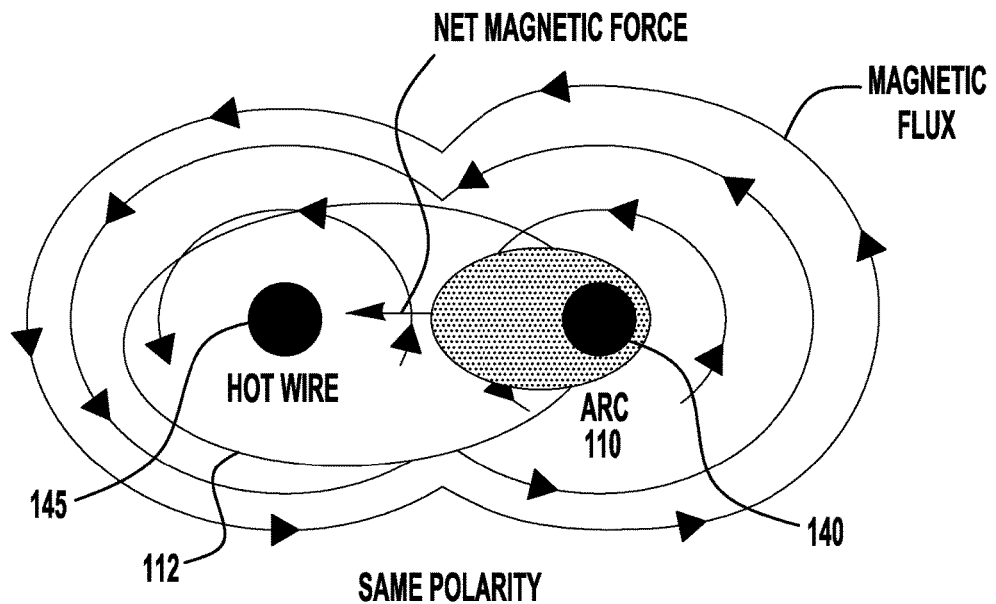
FIGS. 6A and 6B illustrate magnetic field orientations corresponding to the polarity alignments of FIGS. 5A and 5B.

For example, when the currents through the welding consumable 140 (arc 110) and hot wire 145 are in phase, i.e., the pulses and polarity align (see FIG. 5A), the currents will produce magnetic flux lines that flow in the same direction as illustrated in FIG. 6A. In the space between the arc 110 and the hot-wire 145 the flux lines flow in opposite directions and, to a large extent, cancel each other, but there is still a magnetic field surrounding the wires 140 and 145. This magnetic field has a net magnetic force that wants to pull the wires 140 and 145 closer to each other. However, this magnetic force is not strong enough to deflect the wires 140 and 145, but the arc 110 is easily deflected. As shown in FIG. 5A, the arc 110 is deflected to the middle, i.e., toward the hot wire 145 and further over the molten puddle 112. In this position, the heating of the arc 110 is generally directed to the molten puddle 112 and not the workpiece 115. By directing the arc 110 to the middle, the admixture between the base metals and molten puddle is minimized, which can be desirable in some applications, e.g., cladding applications. However, in other applications, e.g., joining applications, the reduced admixture may not be a desirable feature.

Figure 5B:
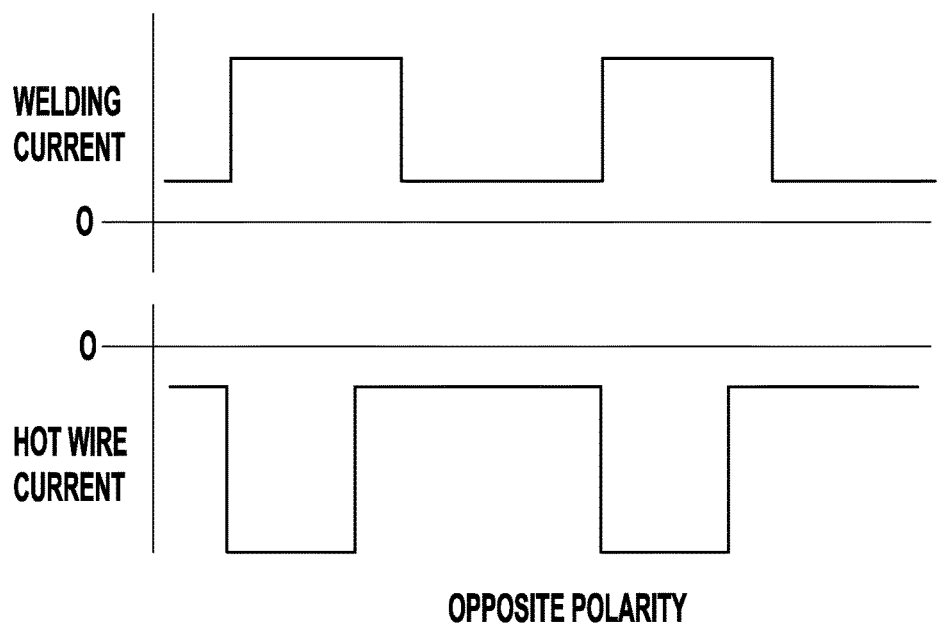
Figure 6B:
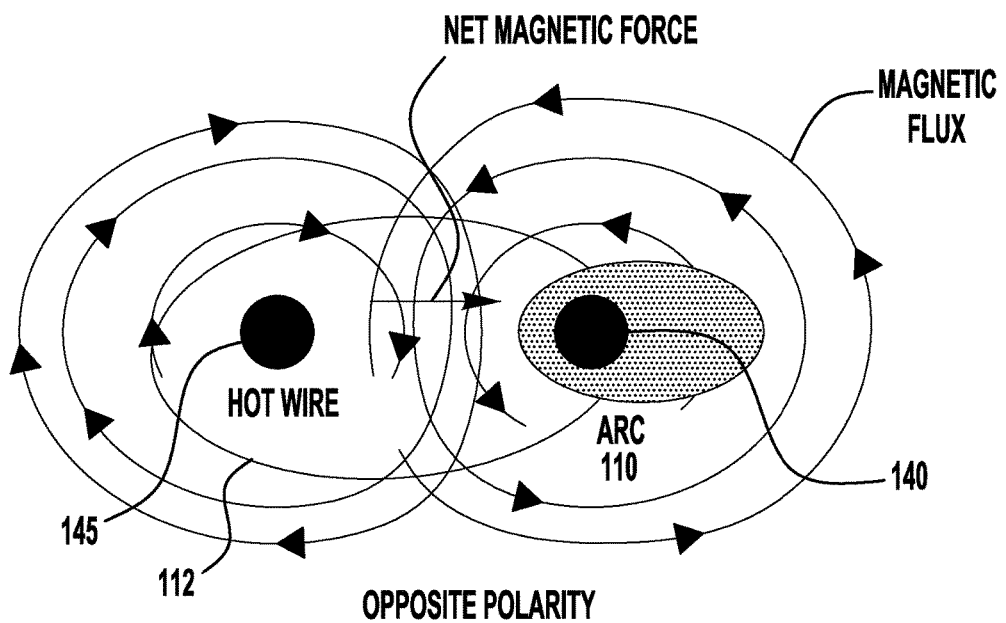

When the currents through the wire 140 and 145 have opposite polarity, e.g., the opposite polarity pulses are aligned (see FIG. 5B), the magnetic lines in the space between wire 145 and arc 110 are intensified. The build up of the magnetic flux creates a net magnetic force that pushes the arc 110 forward, i.e., away from the wire 145 as illustrated in FIG. 6B. In this position, the heating of the arc 110 is generally directed forward of the weld puddle 112 and serves to preheat the workpiece 115. This preheating of the workpiece 115 can be desirable in some applications, e.g., joining applications, in order to increase the penetration and admixture. In addition, the opposite polarity configuration may help prevent burn through in some applications because the arc 110 is not over the puddle 112. However, by preheating in this manner, the weld puddle 112 can have space to cool down before the wire 145 enters the puddle 112, which may not be desirable. In addition, when the polarity is opposite, the potential difference between the hot wire 145 and the arc 110 is such that the arc 110 will tend to jump to the wire 145 rather than to the workpiece 115 if the opposite polarity operation is maintained too long.

When the welding current pulse occurs during a time when the hot wire current is zero, there is minimal effect (or no effect) on the arc 110. In some applications, this operation may be desirable to maintain arc stability.

When the hot wire current waveform is AC, i.e., a varying polarity waveform, the changing magnetic fields will apply a force on the arc 110 in one direction at one polarity and then apply a force in the opposite direction after the polarity has reversed, i.e. the arc 110 will oscillate. The amplitude of the oscillation will depend on the duration and amplitude of the hot wire current pulses. At low AC frequencies, the hot wire current can produce a visible oscillation "sweep" of the arc 110. If the variable polarity hot wire current waveform frequency is increased, the magnitude of the movement of arc 110 will decrease.

As seen above, magnetic fields created by the welding and hot wire currents can have a big influence on the arc 110. Accordingly, without proper control and synchronization between the respective currents, the competing magnetic fields can destabilize the arc 110 and thus destabilize the process. Therefore, exemplary embodiments of the present invention utilize current synchronization between the power supplies 130 and 135 to ensure stable operation, which will be discussed further below. In addition, exemplary embodiments can control the hot wire current pulses such that the arc 110 can be positioned relative to the puddle 112 to optimize the process, e.g., cladding, joining, etc. Thus, based on the application, the frequency, phase angle, and/or amplitude and duration of pulses of the hot wire current can be varied to control the position of arc 110.

FIG. 2 depicts a closer view of an exemplary welding operation of the present invention. As can be seen the torch 120 (which can be an exemplary GMAW/MIG torch) delivers a consumable 140 to the molten puddle 112 (i.e., weld puddle) through the use of the arc 110—as is generally known. Further, contact tube 125, in this embodiment, is integrated into torch 120 and the hot wire consumable 145 is delivered to the molten puddle 110 by wire feeder 155 via contact tube 125. It should be noted that although the torch 120 and contact tube 125 are shown as integrated in this figure, these components can be separate as shown in FIG. 1. Of course, to the extent an integral construction is utilized, electrical isolation within the torch must be used so as to prevent current transfer between the consumables during the process. As stated above, magnetic fields induced by the respective currents can interfere with each other and thus embodiments of the present invention synchronize the respective currents. Synchronization can be achieved via various methods. For example, as illustrated in FIG. 1, a sensing and current controller 195 can be used to control the operation of the power supplies 130 and 135 to synchronize the respective currents. In addition, the sensing and current controller 195 can also be used to control wire feeders 150 and 155. In FIG. 1 the sensing and current controller 195 is shown external to the power supplies 130 and 135, but in some embodiments the sensing and current controller 195 can be internal to at least one of the welding power supplies 130 and 135 or to at least one of the wire feeders 150 and 155. For example, at least one of the power supplies 130 and 135 can be a master which controls the operation of the other power supplies and the wire feeders. During operation, the sensing and current controller 195 (which can be any type of CPU, welding controller, or the like) controls the output of the welding power supplies 130 and 135 and the wire feeders 150 and 155. This can be accomplished in a number of ways. For example, the sensing and current controller 195 can use real-time feedback data, e.g., arc voltage $V_1$, welding current $I_1$, heating current $I_2$, sensing voltage $V_2$, etc., from the power supplies to ensure that the welding waveform and heating current waveform from the respective power supplies are properly synced. Further, the sensing and current controller 195 can control and receive real-time feedback data, e.g., wire feed speed, etc., from the wire feeders 150 and 155. Alternatively a master-slave relationship can also be utilized where one of the power supplies is used to control the output of the other.

The control of the power supplies and wire feeders can be accomplished by a number of methodologies including the use of state tables or algorithms that control the power supplies such that their output currents are synchronized for a stable operation. For example, the sensing and current controller 195 can include a parallel state-based controller. Parallel state-based controllers are discussed in application Ser. Nos. 13/534,119 and 13/438,703, which are incorporated by reference herein in their entirety. Accordingly, parallel state-based controllers will not be further discussed in detail.

Figure 3A:
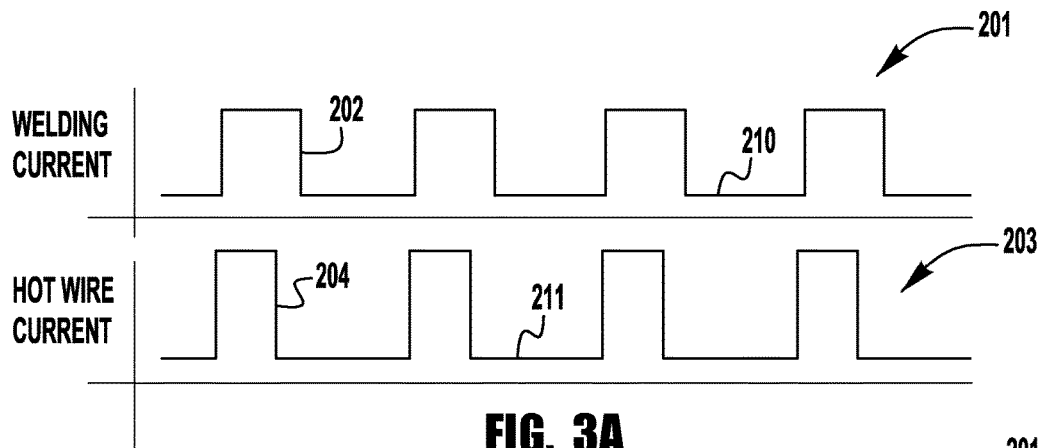
FIGS. 3A-3D illustrate exemplary welding and hot wire waveforms that can be used in the system of FIG. 1.
Figure 3B:
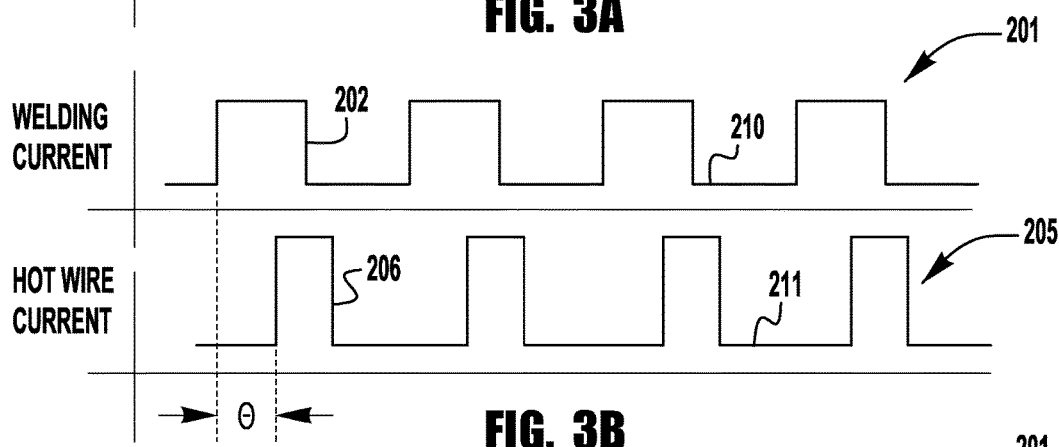
Figure 3C:
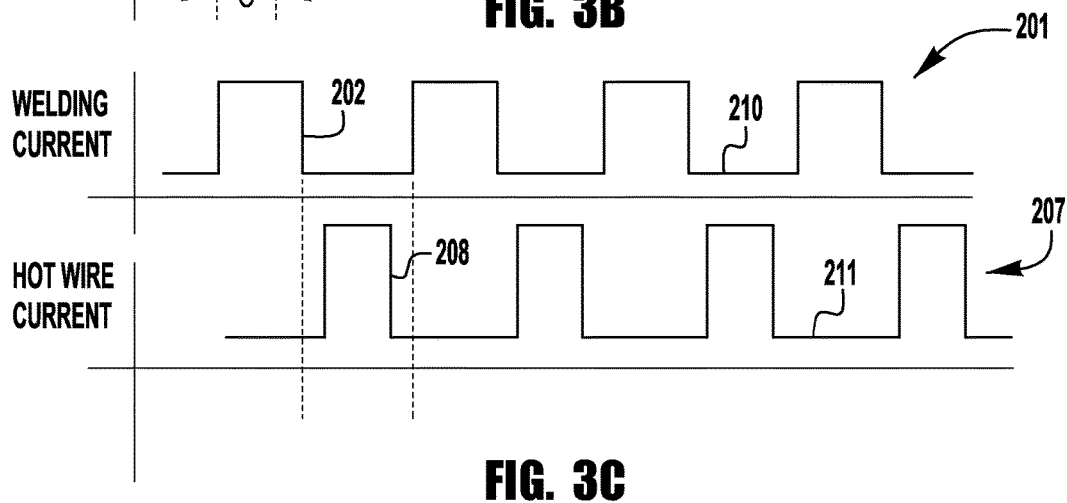

FIGS. 3A-C depicts exemplary current waveforms for the welding current and the hot wire current that can be output from power supplies 130 and 135, respectively. FIG. 3A depicts an exemplary welding waveform 201 (e.g., GMAW waveform) which uses current pulses 202 to aid in the transfer of droplets from the wire 140 to the puddle 112 via the arc 110. Of course, the welding waveform shown is exemplary and representative and not intended to be limiting, for example the welding current waveform can be that used for pulsed spray transfer, pulse welding, short arc transfer, surface tension transfer (STT) welding, shorted retract welding, etc. The hot wire power supply 135 outputs a current waveform 203 which also has a series of pulses 204 to heat the wire 145, through resistance heating as generally described above. The current pulses 202 and 204 are separated by a background levels 210 and 211, respectively, of a lesser current level than their respective pulses 202 and 204. As generally described previously, the waveform 203 is used to heat the wire 145 to a desired temperature, e.g., to at or near its melting temperature and uses the pulses 204 and background to heat the wire 145 through resistance heating. As shown in FIG. 3A the pulses 202 and 204 from the respective current waveforms are synchronized such that they are in phase with each other. In this exemplary embodiment, the current waveforms are controlled such that the current pulses 202/204 have a similar, or the same, frequency and are in phase with each other as shown. As discussed above, the effect of pulsing pulses 202 and 204 at the same time, i.e., in phase, is to pull the arc 110 toward the wire 145 and further over the weld puddle 112. Surprisingly, it was discovered that having the waveforms in phase produces a stable and consistent operation, where the arc 110 is not significantly interfered with by the heating current generated by the waveform 203.

FIG. 3B depicts waveforms from another exemplary embodiment of the present invention. In this embodiment, the heating current waveform 205 is controlled/synchronized such that the pulses 206 are out-of-phase with the pulses 202 by a constant phase angle $\Theta$. In such an embodiment, the phase angle is chosen to ensure stable operation of the process and to ensure that the arc is maintained in a stable condition. In exemplary embodiments of the present invention, the phase angle $\Theta$ is in the range of 30 to 90 degrees. In other exemplary embodiments, the phase angle is 0 degrees. Of course, other phase angles can be utilized so as to obtain stable operation, and can be in the range of 90 to 270 degrees, while in other exemplary embodiments the phase angle is in the range of 0 and 180 degrees.

FIG. 3C depicts another exemplary embodiment of the present invention, where the hot wire current 207 is synchronized with the welding waveform 201 such that the hot wire pulses 208 are out-of phase such that the phase angle $\Theta$ is about 180 degrees with the welding pulses 202, and occurring only during the background portion 210 of the waveform 201. In this embodiment the respective currents are not peaking at the same time. That is, the pulses 208 of the waveform 207 begin and end during the respective background portions 210 of the waveform 201.

In some exemplary embodiments of the present invention, the pulse width of the welding and hot-wire pulses is the same. However, in other embodiments, the respective pulse-widths can be different. For example, when using a GMAW pulse waveform with a hot wire pulse waveform, the GMAW pulse width is in the range of 1.5 to 2.5 milliseconds and the hot-wire pulse width is in the range of 1.8 to 3 milliseconds, and the hot wire pulse width is larger than that of the GMAW pulse width.

In some exemplary embodiments, along with changing the width of the hot wire current pulse and the phase angle $\Theta$, the background current of the hot wire current can also be adjusted to provide a more stable arc 110 and/or influence the arc 110 as discussed above. In many hot wire systems, however, it is desirable to maintain an average heating current through the wire 145 in order to maintain a consistent temperature for the hot wire. Thus, in some embodiments, a change in the background current will also require a change to the peak pulse current.

Figure 3D:
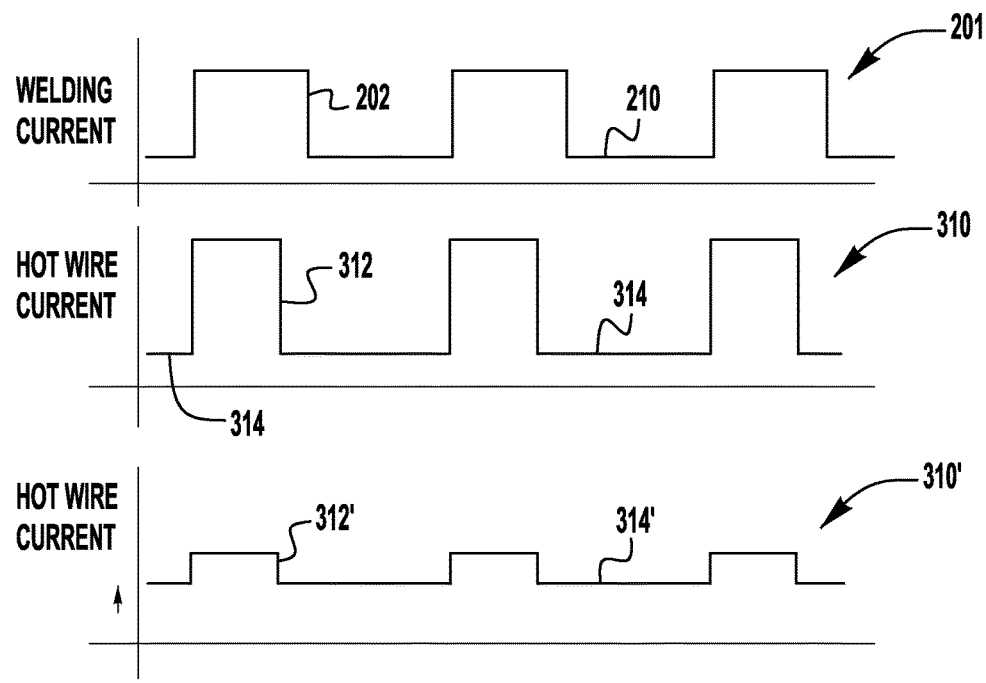
Figure 8:
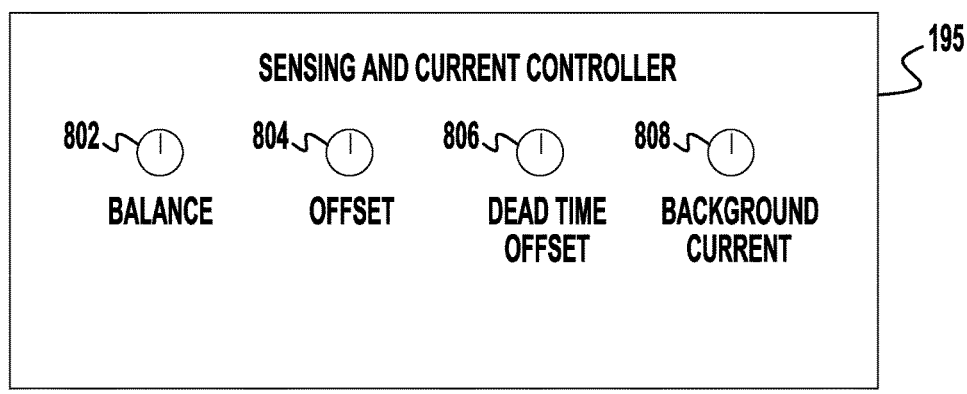
FIG. 8 illustrates exemplary waveform controls for the sensing and current controller of FIG. 1.

For example, in FIG. 3D, the hot wire waveform 310, which is similar to waveform 203, has peak pulses 312 which are separated by a background current 314. In this exemplary embodiment, the peak pulses 312 are synchronized to align with the pulses 202 of waveform 201 similar to that of the embodiment in FIG. 3A. Thus, the behavior of the arc 110 with waveform 310 will be similar to that of the embodiment discussed above with respect to FIG. 3A. If, however, it is desired that the arc 110 not be pulled as far over the puddle 112 during the pulse current 312 period, the background current level can be increased as shown in waveform 310' (the background current 314' is at a higher level then background current 314 of waveform 310). When the background current is increased, the peak current pulse (see pulse 312') has to be lowered in order to maintain the same average current through the wire 145. Accordingly, by changing the hot wire background current, an operator can influence the behavior of the arc 110 during the peak pulse periods. Of course, the arc 110 will also be influenced by the background current, but the influence due to the change in background current is less than the change in the peak current because the magnetic field produced by a current is proportional to the square of the current. In some embodiments, the background current adjustment can be located on the sensing and current controller 195 as shown in FIG. 8 (see background current control 808) and/or on the hot wire power supply 135 (not shown). The method of setting the background current is not limiting. For example, the background current control 808 can be set based an actual value for the background current or as a ratio of peak current to background current to name just two. The adjustment to the peak and/or background currents based on the setting of background current control 808 can be done automatically, e.g., by the sensing and current controller 195 or by the hot wire power supply 135.

Accordingly, depending on the application, exemplary embodiments of the present invention can provide more or less amplitude to the hot wire current peak pulse by changing the hot wire background current. For example, in cladding operations, a high peak amplitude similar to peak pulse 312 of waveform 310 may be desired. This is because the peak pulse 312, when aligned with welding pulse 202, will deflect the arc 110 over the puddle 112 and a higher amplitude will provide a greater deflection. By having the arc 110 over the puddle 112, there is less penetration of the base metal of workpiece 115 by arc 110 and therefore, less of the base metal mixes with the puddle 112. However, in joining applications, more penetration can be required. In such applications, the background current can be increased in order to drop the amplitude as illustrated in waveform 310'. If the magnitude of the peak current is decreased, the arc 110 will not be pulled over the puddle 117 as much. Accordingly, there is deeper penetration into the base metal of workpiece 115 by the arc 110. The deeper penetration provides more admixture and better fusion in, e.g., joining applications.

It should be noted that although the heating current in the exemplary embodiments is shown as a pulsed current, for some exemplary embodiments the heating current can be constant power. The hot-wire current can also be a pulsed heating power, constant voltage, a sloped output and/or a joules/time based output.

As explained herein, to the extent both currents are pulsed currents, they should to be synchronized to ensure stable operation. There are many methods that can be used to accomplish this, including the use of synchronization signals. For example, the sensing and current controller 195 (which can, e.g., be integral to either or the power supplies 135/130) can set a synchronization signal to start the pulsed arc peak and also set the desired start time for the hot wire pulse peak. As explained above, in some embodiments, the pulses will be synchronized to start at the same time, while in other embodiments the synchronization signal can set the start of the pulse peak for the hot wire current at some duration after the arc pulse peak—the duration would be sufficient to obtained the desired phase angle for the operation.

In the embodiments discussed above, the arc 110 is positioned in the lead—relative to the travel direction. This is shown in each of FIGS. 1 and 2. This is because the arc 110 is used to achieve the desired penetration in the workpiece(s). That is, the arc 110 is used to create the molten puddle 112 and achieve the desired penetration in the workpiece(s). Then, following behind the arc process is the hot wire process. The addition of the hot wire process adds more consumable 145 to the puddle 112 without the additional heat input of another welding arc, such as in a traditional tandem MIG process in which at least two arcs are used. Thus, embodiments of the present invention can achieve significant deposition rates at considerably less heat input than known tandem welding methods.

As shown in FIG. 2, the hot wire 145 is inserted in the same weld puddle 112 as the arc 110, but trails behind the arc by a distance D. In some exemplary embodiments, this distance is in the range of 5 to 20 mm, and in other embodiments, this distance is in the range of 5 to 10 mm. Of course, other distances can be used so long as the wire 145 is fed into the same molten puddle 112 as that created by the leading arc 110. However, the wires 140 and 145 are to be deposited in the same molten puddle 112 and the distance D is to be such that there is minimal adverse magnetic interference with the arc 110 by the heating current used to heat the wire 145. In general, the size of the puddle 112—into which the arc 110 and the wire 145 are collectively directed—will depend on the welding speed, arc parameters, total power to the wire 145, material type, etc., which will also be factors in determining a desired distance between wires 140 and 145.

As stated above, because at least two consumables 140/145 are used in the same puddle 112 a very high deposition rate can be achieved, with a heat input which is similar to that of a single arc operation with up to twice the deposit rate. This provides significant advantages over tandem MIG welding systems which have very high heat input into the workpiece. For example, embodiments of the present invention can easily achieve at least 23 lb/hr deposition rate with the heat input of a single arc. Other exemplary embodiments have a deposition rate of at least 35 lb/hr.

In exemplary embodiments of the present invention, each of the wires 140 and 145 are the same, in that they have the same composition, diameter, etc. However, in other exemplary embodiments the wires can be different. For example, the wires can have different diameters, wire feed speeds and composition as desired for the particular operation. In an exemplary embodiment the wire feed speed for the lead wire 140 is higher than that for the hot wire 145. For example, the lead wire 140 can have a wire feed speed of 450 ipm, while the trail wire 145 has a wire feed speed of 400 ipm. Further, the wires can have different size and compositions. In fact, because the hot wire 145 does not have to travel through an arc to be deposited into the puddle the hot wire 145 can have materials/components which typically do not transfer well through an arc. For example, the wire 145 can have a tungsten carbide, or other similar hard facing material, which cannot be added to a typical welding electrode because of the arc. Additionally, the leading electrode 140 can have a composition which is rich in wetting agents, which can help in wetting the puddle 112 to provide a desired bead shape. Further, the hot wire 145 can also contain slag elements which will aid in protecting the puddle 112. In addition, the hot wire 145 can also include elements/components which impede or hamper the arc performance but are added to the puddle to improve some aspect of the weld bead, e.g., for added strength, better cold weather performance, better creep resistance at higher temperatures, better machinability, improved crack resistance, improved bead wet-ability, or alloying elements to resist or aid in the formation of specific grain structures. Therefore, embodiments of the present invention allow for great flexibility in the weld chemistry. It should be noted that because the wire 140 is the lead wire, the arc welding operation, with the lead wire 140, provides the penetration for the weld joint, where the hot wire 145 provides additional fill for the joint.

In some exemplary embodiments of the present invention, the combination of the arc 110 and the hot-wire 145 can be used to balance the heat input to the weld deposit, consistent with the requirements and limitations of the specific operation to be performed. For example, the heat from the lead arc 110 can be increased for joining applications where the heat from the arc aids in obtaining the penetration needed to join the work pieces and the hot-wire 145 is primarily used for fill of the joint. However, in cladding or build-up processes, the hot-wire wire feed speed can be increased to minimize dilution and increase build up.

Further, because different wire chemistries can be used a weld joint can be created having different layers, which is traditionally achieved by two separate passes. The lead wire 140 can have the required chemistry needed for a traditional first pass, while the trail wire 145 can have the chemistry needed for a traditional second pass. Further, in some embodiments at least one of the wires 140/145 can be a cored wire. For example the hot wire 145 can be a cored wire having a powder core which deposits a desired material into the weld puddle.

Figure 4:
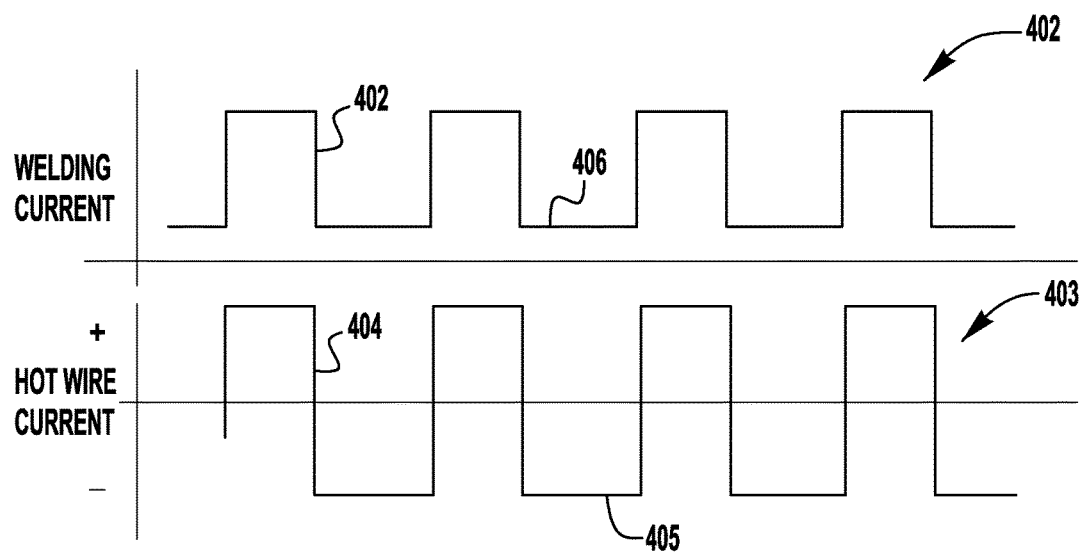
FIG. 4 illustrates exemplary welding and hot waveforms that can be used in the system of FIG. 1.

FIG. 4 depicts another exemplary embodiment of current waveforms of the present invention. In this embodiment, the hot wire current 403 is an AC current, which is synchronized with the welding current 401 (e.g. a GMAW system). In this embodiment, the positive pulses 404 of the heating current are synchronized with the pulses 402 of the current 401, while the negative pulses 405 of the heating current 403 are synchronized with the background portions 406 of the welding current. Of course, in other embodiments the synchronization can be opposite, in that the positive pulses 404 are synchronized with the background 406 and the negative pulses 405 are synchronized with the pulses 402. In another embodiment, there is a phase angle between the pulsed welding current and the hot wire current. By utilizing an AC waveform 403 the alternating current (and thus alternating magnetic field) can be used to aid in stabilizing the arc 110. Of course, other embodiments can be utilized without departing from the spirit or scope of the present invention.

In some embodiments of the present invention, the welding current can be a constant or near constant current waveform. In such embodiments, an alternating heating current 403 can be used to maintain the stability of the arc. The stability is achieved by the constantly changed magnetic field from the heating current 403. It should be noted that although FIGS. 3A-3C and 4 depict the exemplary waveforms as DC welding waveforms, the present invention is not limited in this regard as the pulse waveforms can also be AC.

In some embodiments of the present invention, the hot wire polarity can be varied in order to provide greater control of/influence over the arc 110. This is done by varying the magnetic fields surrounding the wires 140 and 145 in order to push or pull the arc 110 in a particular direction as desired. That is, the position of the arc 110 relative to the weld puddle 112 can be changed as desired to meet the needs of the application and/or counteract the effects of adverse magnetic interactions. For example, as explained above, if the welding current and the hot wire current are at the same polarity, the arc 110 will be pulled toward wire 145 due to the magnetic interactions. If the welding current and the hot wire current are at opposite polarities, the arc 110 will be pushed forward (i.e., away from puddle 112) due to the magnetic interactions. If a neutral deflection is desired (little or no deflection), the welding current is pulsed when the hot wire current is at a reduced background current value or between the positive and negative cycles, e.g., when the hot wire current is being held at zero. Accordingly, the position of arc 110 relative to the puddle 112 depends on the magnetic fields created by the welding current and hot wire current, and by synchronizing the respective pulses of the current waveforms, these magnetic fields can be controlled to optimize a process and/or to provide arc stability.

Figure 7:
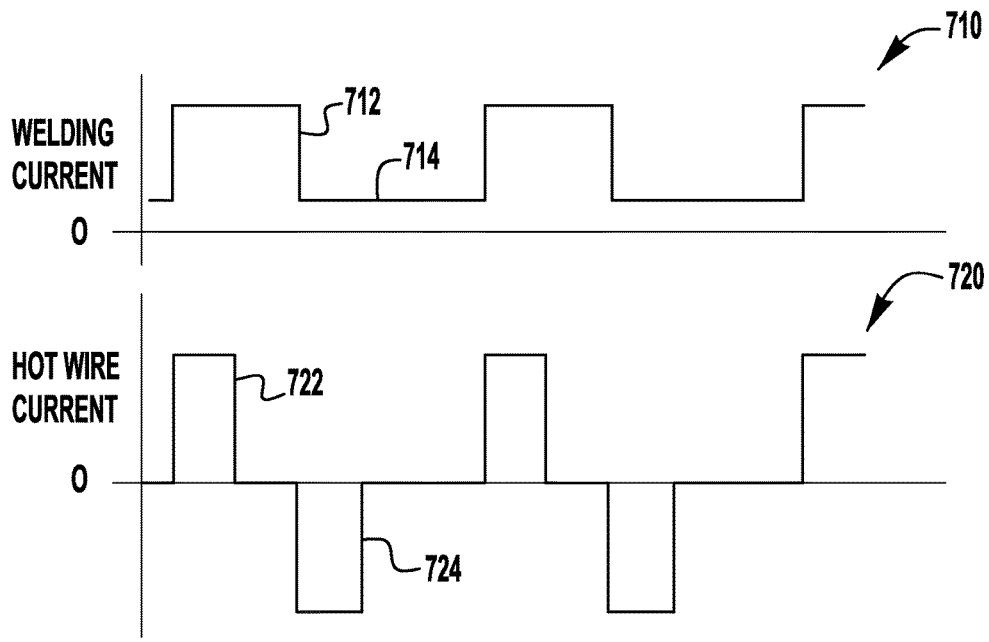
FIG. 7 illustrates exemplary welding and hot waveforms that can be used in the system of FIG. 1.

For example, FIG. 7 illustrates an exemplary welding current waveform 710 and an exemplary hot wire current waveform 720 that can be used in the system of FIG. 1. The welding current waveform 710 includes pulses 712 separated by a background current level 714. As discussed above, the welding current flows through the wire 140 and creates the arc 110. Wire material in the form of droplets is transferred via the arc 110 during the pulses 712. Although the arc 110 is maintained during the background current level 714, no material is transferred.

The hot wire current waveform 720 in this exemplary embodiment is an AC waveform with positive pulses 722 and negative pulses 724. As discussed above, the pulses 722 and/or 724 of hot wire current waveform 720 can be synchronized with pulses 712 of the welding waveform 710 to optimize a process, e.g., a cladding or a joining process, and/or to stabilize the arc 110. For example, in some joining operations, it can be desirable to optimize the process such that it will transfer the droplets from wire 140 directly over the middle of the weld puddle 112 (rather than at the edge), and will also preheat the workpiece 115 when droplets are not being transferred. Exemplary embodiments of the present invention can perform this optimization.

As illustrated in FIG. 7, the hot wire current pulses 722 can be synchronized with the welding pulses 712 such that the pulses 712 and 722 are in phase. When these pulses are in phase, the arc 110 will be pulled toward the hot wire, over the middle of puddle 112 (see FIG. 6A) as discussed above, and the droplets from wire 140 will transfer toward the center of the puddle. In addition, the negative pulses 724 can be synchronized such that they pulse during the background current 714 phase of waveform 710. The background welding current 714 maintains the arc 110 and therefore has an associated magnetic field, albeit weaker than the positive pulse 712 magnetic field. When the negative pulse 724 is pulsed, the magnetic fields of the two currents will be of opposite polarity and the arc 110 will be pushed forward (see FIG. 6B) as discussed above. As no droplets are transferred, the arc 110 will preheat the workpiece 115. Also, by pushing the arc 110 forward during this time, the background welding current 714, the pulse 724 can help clean the plate, e.g., when welding coated materials such as galvanized plate or primer coated plate. In addition, in some systems, opposite polarity operations can help prevent burn through by deflecting the arc 110 away from the puddle 112 to let the puddle cool. Accordingly, by appropriately synchronizing the pulses of the hot wire current waveform, which can be a variable polarity waveform, with the welding waveform, the magnetic fields can be manipulated to optimize the processes, e.g., joining processes, cladding processes, etc.

In the above exemplary embodiment, the pulses 712 and 722 were synchronized to provide peak current at the same time. However, the present invention is not limited to this configuration. As with the other exemplary embodiments discussed above, the synchronization of the hot wire current pulse 722 with welding waveform pulse 712 and/or of pulse 724 with background current 714 can be offset by an phase angle Θ as desired for stable operations/optimizations. In addition, as with the other exemplary embodiments discussed above, the widths of pulses 712, 722, and 724 can be varied as desired.

As seen above, the ability to change/influence the position of the arc 110 is desirable. However, conventional hot wire power supplies are balanced in that they provide an even push/pull force to the arc of the primary heat source, e.g. a TIG torch. But in many applications, the arc is more stable and/or the process becomes more efficient if the arc is pulled slightly toward the hot wire side. Also, as seen above, pushing the arc forward can also be desirable in some situations. To this end, some exemplary embodiments of the present invention provide user controls directed to controlling the position of the arc relative to the puddle.

As illustrated in FIG. 8, the sensing and current controller 195 includes a balance control 802, an offset control 804, and a dead time offset control 806. These controls can be used to adjust the hot wire current waveform as discussed below. The sensing and current controller 195 can include other controls related to welding operations. However, for brevity, only those controls pertinent to explaining the present invention are shown and discussed. Of course, in some embodiments, the waveform controls discussed below can be located on the hot wire power supply 135.

The balance control 802 adjusts the duration of the positive polarity relative to duration of the negative polarity of the hot wire current waveform. The method of controlling the balance is not limiting. For example, the balance control 802 can be configured to select a ratio between the positive polarity and the negative polarity. In this case a ratio of 1 means that the duration of the positive pulse equals the duration of the negative pulse, i.e., the width of the pulses are equal. The balance control 802 can also be configured to select the actual time of either the positive or negative pulse, e.g., the balance control 802 can adjust one of the pulse durations and the other can be automatically determined by the sensing and current controller 195. For example, if the total time of the pulses is 10 ms, the balance control 802 can set the positive pulse duration to, e.g., 6 ms, in which case the negative pulse duration will automatically be set to 4 ms by the sensing and current controller 195. The balance control 802 can also be configured to select the percentage of time that the polarity will be either positive or negative. For example, the balance control 802 can select, e.g., 60% for the positive pulse duration and the negative pulse duration will automatically be set to 40% by the sensing and current controller 195. The actual duration values in ms for the positive and negative pulses can then be automatically set by the sensing and current controller 195. Of course, the balance control 802 can be configured such that only one of the pulses (positive or negative) is adjusted at any given time. In addition, the present invention is not limited to the above methods to control the balance and other means can be used without departing from the spirit of the invention.

Figure 9:
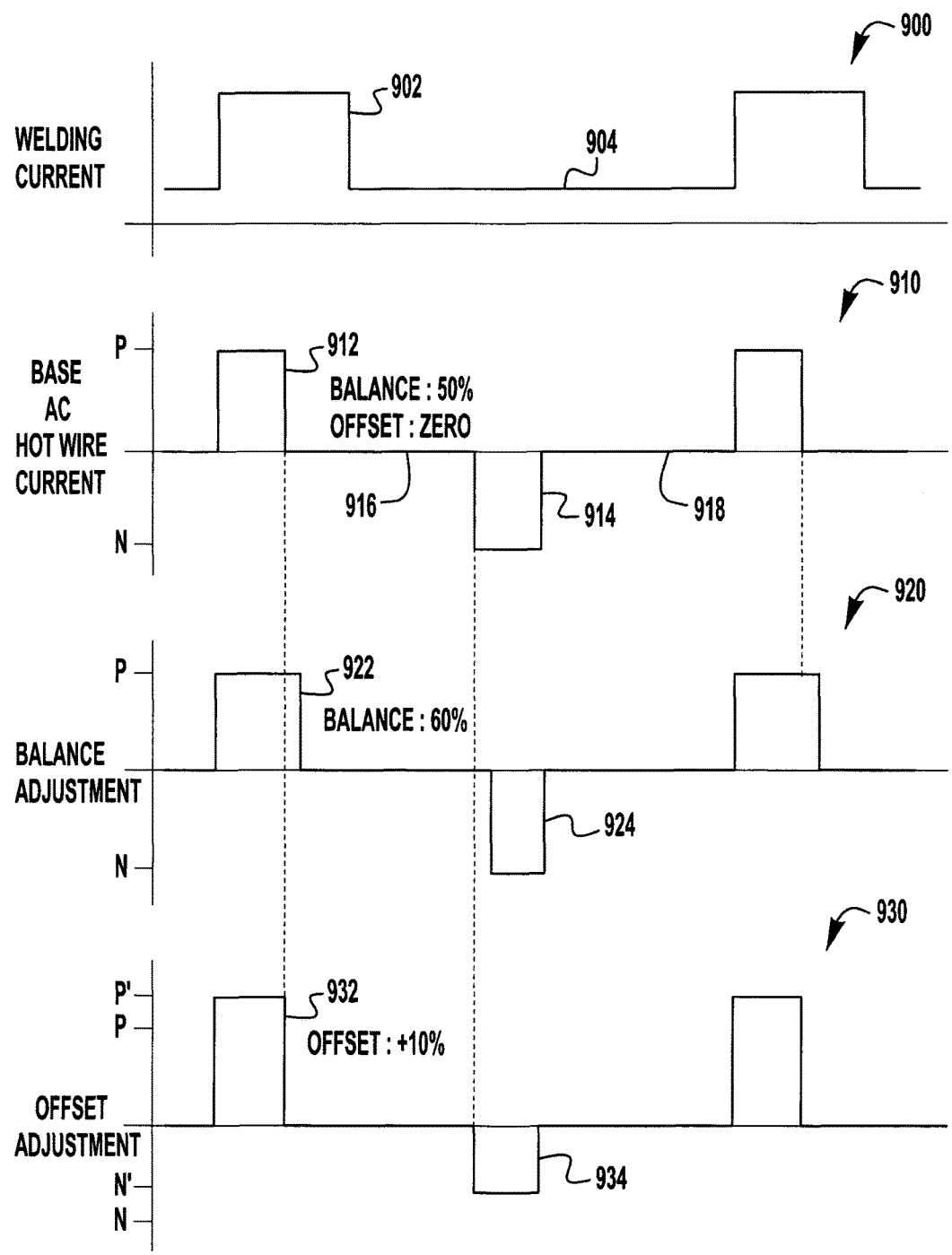
FIGS. 9-11 illustrate exemplary welding and hot waveforms that can be used in the system of FIG. 1.

The sensing and current controller 195 can be configured with one or more base (or reference) hot wire current waveforms, which will then be modified based on the controls 802-806. For example, as illustrated in FIG. 9, the sensing and current controller 195 can include a base waveform 910 that is set for a 50% balance with the duration of the positive pulse 912 equaling the duration of the negative pulse 914. In this example, the positive pulses 912 of the base waveform 910 are synchronized with pulses 902 of welding waveform 900. Based on the application, an operator may decide that pulling the arc 110 to the middle of the puddle 112 for a longer duration is desirable because, e.g., it will provide a better weld, more stable arc, more efficient process, etc. As one example, the operator may want to pull the arc 110 for a longer duration in order to reduce penetration and admixture because a cladding operation is being performed. Thus, the operator can adjust the balance control 802 to, e.g., 60% instead of 50%. The effect of this operation, as seen in waveform 920, is to increase the duration of the positive pulse 922 and decrease the duration of the negative pulse 924, as compared to base waveform 910. This will pull the arc 110 toward wire 140 for a longer duration than with the base waveform 910 with 50% balance.

In addition to the balance control 802, the sensing and current controller 195 can include an offset control 804. The offset control adjusts the amplitude of the positive polarity relative to the amplitude of the negative polarity. That is, the "zero" line is adjusted to give either a greater positive amplitude or a greater negative amplitude. For example, waveform 930 illustrates an exemplary case where the offset is moved such that the amplitude of the pulse 932 (P') is greater than the amplitude (P) of the pulse 912 of base waveform 910 and the absolute value of negative pulse 934 (N') is less than the absolute value of negative pulse 914 (N) of base waveform 910. By adjusting the offset control 804 such that the amplitudes are more positive, the deflection on arc 110 toward the puddle 112 is greater than the base waveform 910 during the time the welding pulses 902 are pulsed. Conversely, the forward deflection of arc 110 is less than the base waveform 910 during the time of the background welding current 904. The offset adjustment is not limited to any one method. For example, the adjustment can be based on actual current values, e.g., allowing an adjustment in the range of ±200 amps (or any other desired range). The offset adjustment can also be in terms of percentage. For example, a +10% adjustment can mean the "zero" will be moved by 10% with respect to, e.g., a peak-to-peak value (or some other amplitude reference) such that the waveform 930 will have a more positive peak value (P') for pulse 932 and a lower absolute peak value for negative pulse 934 (N') as shown in FIG. 9. Based on the setting of the offset control 804, the sensing and current controller can automatically set the actual current amplitudes in amps for the positive and negative peak values.

Figure 10:
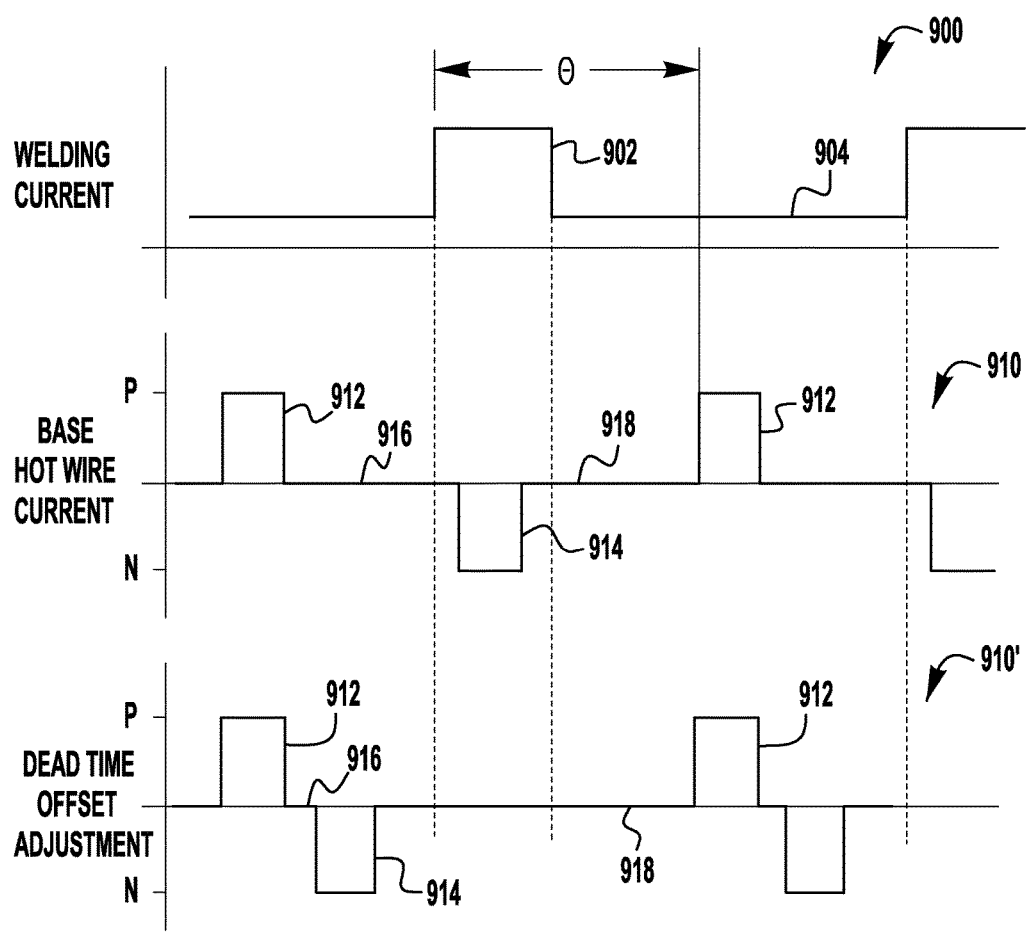

The sensing and current controller 195 can also include a dead time offset control 806. "Dead time" is the time period that the hot wire current is held at zero during the transition from positive to negative (see 916 of waveform 910) and from negative to positive (see 918). The dead time offset control adjusts the ratio of the dead time from positive to negative relative to the dead time from negative to positive. Of course, other methods can be used to control the duration of each dead time 916 and 918 without departing from the spirit of the invention. The dead time offset adjustment is used to minimize the effect of the hot wire magnetic field on the arc. For example, as illustrated in FIG. 10, it may be desirable to have the welding current pulse at a time when the hot wire current is at a value of zero (i.e., at a dead time) to minimize the effect if the hot wire magnetic field on the arc 110. This can be accomplished by having the pulses 912 offset by a phase angle Θ as shown in FIG. 10 such that the pulse 912 does not pulse when the welding pulse 902 is pulsed. However, the base waveform 910 has a negative pulse 914 that can still interfere with the welding pulse 902 at the desired phase angle Θ. To minimize the effect of the negative pulse 914, the dead time offset control 806 can be configured to adjust the ratio of the dead times 916 and 918 such that the welding pulse 902 aligns with a dead time of hot wire current waveform. As shown in waveform 910' of FIG. 10, by adjusting the dead time offset control 806, the duration of dead time 916 is decreased and the duration of dead time 918 is increased such that the negative pulse 914 is moved closer to the positive pulse 912. By moving the negative pulse 914, the welding pulse 902 is able to pulse during the dead time 918 of waveform 910'. Thus, based on the setting of dead time offset control 806, the sensing and current controller 195 can automatically set the dead times in ms for each zero transition.

As seen in the exemplary embodiments discussed above, a variable polarity hot wire current waveform provides many advantages such as, for example, stable operation in systems that use an arc-type power source, ability to align droplet transfer from consumable electrode with either a dead time or a hot wire current pulse as desired, and ability to perform opposite polarity operations that prevent burn through to name just a few advantages.

Figure 11:
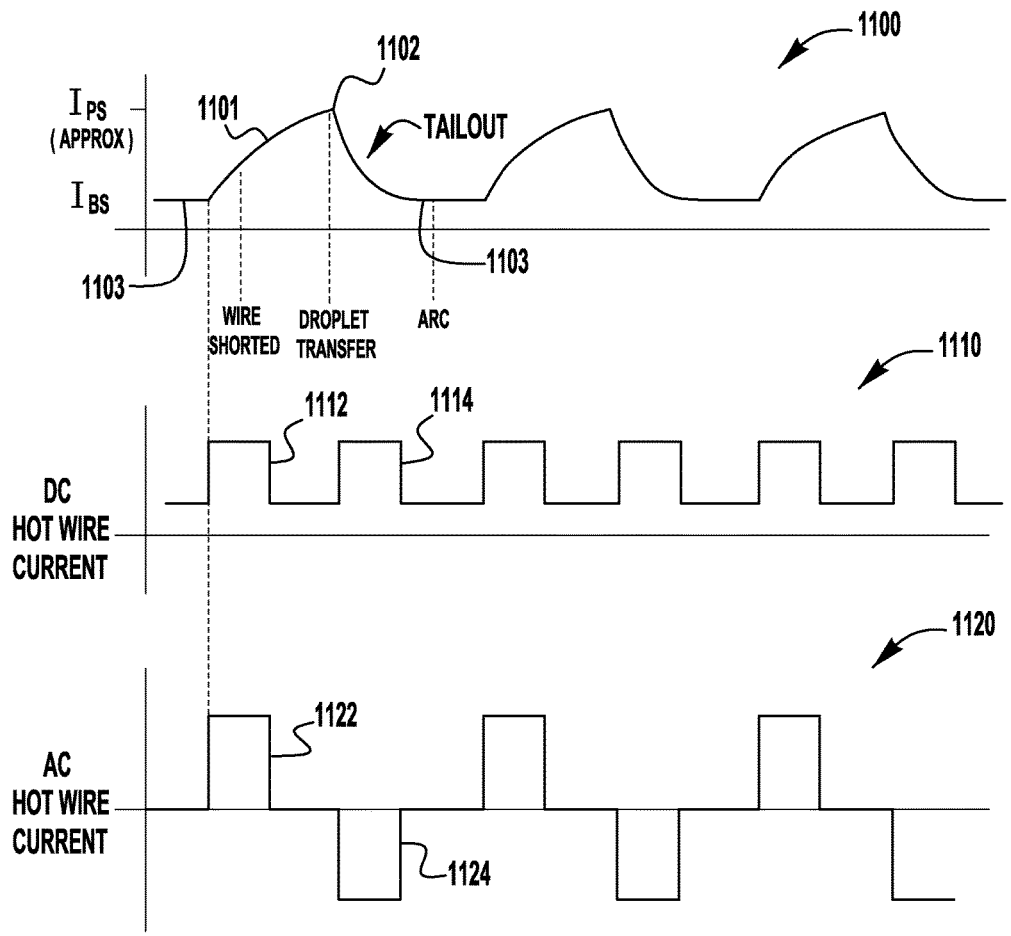

In some embodiments, the welding current waveform can be that of a short arc-type process such as, short arc transfer, surface tension transfer (STT), shorted retract welding, etc. FIG. 11 illustrates a short arc transfer welding waveform 1100 that can be used in the system of FIG. 1. The exemplary welding waveform 1100 that is output from power supply 130 to the wire 140 ramps from a background current $I_{BS}$ (1103) to a current value $I_{PS}$. During the background current phase 1103 the arc 110 is present, but no material from the wire 140 is transferred. When the wire 140 shorts to the weld puddle 112, the welding current increases in value (see 1101) until a droplet from wire 140 is transferred to the weld puddle 112 (see $I_{PS}$, 1102). The current value $I_{PS}$ is approximate as the value may vary for each droplet that is transferred. Once the droplet is transferred (1102), the current drops to the background current $I_{BS}$. Short arc transfer is known in the art and will not be further discussed in detail except as necessary to explain the present invention.

Short arc transfer (and other short-arc-type processes) has traditional been used in many applications such as e.g., joining thin metals, cladding, building up, etc. because the process deposits metal at low heat inputs. However, deposit rates can be limited, e.g., up to approximately 225 ipm wfs. When combined with a hot wire system, e.g., the hot wire feeder system 104 (FIG. 1), and by synchronizing the hot wire current waveform pulses with the welding waveform pulses as discussed below, the deposit rate of the system (hot wire and welding consumables together) can increase two to three times, e.g., up to 500 ipm for a 0.45 in diameter wire.

For example, it has been found that providing a hot wire current pulse during the time the consumable wire 140 is touching the puddle 112 assists in droplet transfer from the wire 140. Because the polarities of the hot wire current and welding current are in phase, the magnetic field from the hot wire current pulse will help "pull" the droplet from wire 140 to assist in the short arc transfer process. Thus, exemplary embodiments of the present invention can be configured to synchronize the hot wire current pulses to align with the time period that wire 140 is shorted to puddle 112 (see 1101 of waveform 1100).

For example, the sensing and current controller 195 (or some other device) can synchronize the current pulses 1112 such that the pulses 1112 are initiated when the wire 140 is shorted during period 1101 of welding waveform 1100. Because pulse 1112 and the welding current at 1101 have the same polarity, the magnetic fields are in the configuration shown in FIG. 6A. Thus, the net force of the magnetic fields will want to force the wires 140 and 145 closer together. Although the net magnetic force is not strong enough to deflect the wires, this force will help transfer ("pull") the droplet from wire 140, as the welding power supply 130 performs the short arc transfer process. In the exemplary embodiment of FIG. 11, the pulse 1112 starts as soon as the sensing and current controller 195 (or some other device) senses that the wire 140 is shorted to puddle 112. The method of sensing the short is not limiting. For example, the sensing and current controller 195 can use feedback such as arc voltage $V_1$, current $I_1$, power from power supply 130, etc. to sense when the wire 140 has shorted to puddle 112. However, as in the exemplary embodiments discussed above, the start of the hot wire pulse can be varied by a phase angle as desired based on the welding process. In addition, as in the exemplary embodiments above, the width and amplitude of pulse 1112 can be varied as desired.

In some embodiments, it is desirable to pull the arc 110 toward the hot wire 145 during the "peak & tailout" period of the short arc transfer. For example, if the arc 110 is located over the puddle 112, the arc 110 can help wash out the puddle 112 as the torch 120 travels forward. To accomplish this, the sensing and current controller 195 (or some other device) can synchronize the hot wire current waveform 1110 with the short arc transfer waveform 1100 such that the hot wire current pulses 1114 will align with the "peak & tailout" period, i.e., arcing period, of waveform 1100 (see FIG. 11). Because the pulses 1114 and waveform 1100 have the same polarity, the arc 110 will be pulled further over the puddle 112 as shown in FIG. 6A. Similar to the exemplary embodiments discussed above, the sensing and current controller 195 can use feedback such as arc voltage $V_1$, current $I_1$, power from power supply 130, etc. to sense when the wire 140 is in the arcing period in order to control when pulses 1114 should be initiated. In addition, the start of the pulses 1114 can be delayed by a phase angle as desired. Further, the width and amplitude of pulses 1114 can be varied as desired. Conversely, in some embodiments, the controller 195 can use feedback such as arc voltage $V_1$, current $I_1$, power from power supply 130, etc. to sense when the wire 140 is shorted in order to increase the current through the hot wire 145 and increase the wire feed speed by controlling wire feeder 155. This increases the deposit rate, but the increased hot wire current does not affect the arc, as the wire 140 is shorted to the puddle 112 and there is no arc.

As illustrated in the exemplary waveform 1110, hot wire current pulses 1112 and 1114 can be included in the same waveform such that the pulses 1112 can help transfer the droplet as described above and pulse 1114 can pull the arc 110 to wash out the puddle 112. Of course, embodiments of the present invention can include only one of pulses 1112 and pulses 1114 as desired.

In some embodiments, it can be desirable to push the arc 110 ahead of the puddle 112 during the "peak & tailout" period of waveform 1100. By pushing the arc 110 ahead, the arc 110 can preheat the workpiece 115 in order to improve "wetting action." As discussed above, in order to push the arc 110 ahead of the puddle 112, the hot wire current pulses and welding current pulses need to be of opposite polarity. Accordingly, in some embodiments of the present invention, a variable hot wire current waveform is used with short arc-type processes. As shown in FIG. 11, hot wire current waveform 1120 includes negative pulses 1124. The negative pulses 1124 are synchronized with the "peak & tailout" period of waveform 1100. Because pulses 1124 and waveform 1100 are of opposite polarities, the arc 110 is pushed ahead of the puddle 112 during this time period. As with the other exemplary embodiments discussed above, the phase angle can be varied such that the pulses 1124 start anywhere within the "peak & tailout" period of waveform 1100 as desired to meet the needs of the application. In addition, the width and amplitude of the pulses 1124 can be varied as desired, e.g., by using the balance control 802 and the offset control 804, respectively.

The exemplary waveform 1120 can also includes pulses 1122, which are synchronized with the shorting period of welding waveform 1100 (see 1101). The effect of pulses 1122 is similar to the effect of pulses 1112 of the exemplary embodiment described above, i.e., pulses 1122 will help transfer the droplets from wire 140 during the time the wire 140 is shorted. Accordingly, pulses 1122 will not be further discussed. In some exemplary embodiments, pulses 1122 and 1124 can be included in the same waveform such that the pulses 1122 can help transfer the droplet as described above and pulse 1124 can push the arc 110 to preheat the workpiece 115. Of course, some embodiments can include only one of pulses 1122 and pulses 1124 as desired.

It should be noted that although a GMAW system is shown and discussed regarding depicted exemplary embodiments with DC and variable polarity hot wire current waveforms, exemplary embodiments of the present invention can also be used with TIG, Plasma, FCAW, MCAW, and SAW systems in applications involving joining/welding, cladding, brazing, and combinations of these, etc. Of course with TIG and Plasma systems, the electrode is not consumable.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding system, said system comprising:
 a welding power supply configured to output a welding current waveform that includes welding current pulses and a background welding current to a first wire via a torch to create an arc between said first wire and a workpiece, said arc creating a molten puddle on said workpiece;
 a first wire feeder configured to feed said first wire to said torch;
 a second wire feeder configured to feed a second wire to said molten puddle via a contact tube;
 a hot wire power supply configured to output a heating current waveform that includes first heating current pulses at a first polarity and second heating current pulses at a polarity that is opposite of said first polarity to said second wire via said contact tube; and
 a controller having a processor programmed to synchronize at least one of said first heating current pulses and said second heating current pulses with at least one of said welding current pulses and said background welding current to influence a position of said arc relative to said second wire based on magnetic fields created by said welding current waveform and said heating current waveform, wherein the controller is configured to couple to the welding power supply and the hot wire power supply.

2. The system of claim 1, wherein said influencing of said arc comprises deflecting said arc toward said second wire by setting said magnetic fields to flow in a same direction, and deflecting said arc away from said second wire by setting said magnetic fields to flow in opposite directions.

3. The system of claim 2, wherein said controller sets said magnetic fields to flow in said same direction by setting said welding current waveform and said heating current waveform to be at a same polarity, and wherein said controller sets said magnetic fields to flow in said opposite directions by setting said welding current waveform and said heating current waveform to be at opposite polarities.

4. The system of claim 1, wherein said controller synchronizes said welding current pulses and said heating current pulses such that said arc is deflected toward said second wire.

5. The system of claim 1, wherein said controller synchronizes said heating current pulses to pulse during said background welding current to deflect said arc away from said second wire.

6. The system of claim 1, wherein said controller performs at least one of cleaning said workpiece and cooling said molten puddle by pulsing said heating current pulses during said background welding current to deflect said arc away from a center of said molten puddle.

7. The system of claim 1, wherein said controller synchronizes said heating current pulses to align with said welding current pulses.

8. The system of claim 1, wherein said heating current pulses are shifted by a desired phase angle from at least one of said welding current pulses and said background welding current.

9. The system of claim 1, wherein at least one of a frequency, phase angle, and amplitude and duration of said heating current pulses is varied to control said position of said arc.

10. The system of claim 1, wherein said welding current waveform is a waveform corresponding to a pulsed spray transfer process, a pulse welding process, a short arc transfer process, a surface tension transfer process, or a shorted retract welding process.

11. The system of claim 1, wherein said controller is configured to select a time duration of said first heating current pulses or said second heating current pulses.

12. The system of claim 1, wherein said controller is configured to adjust an amplitude of said first polarity of said first heating current pulses relative to an amplitude of said polarity opposite of said first polarity of said second heating current pulses.

13. The system of claim 1, wherein said controller is configured to sense an event corresponding to a shorting of said first wire with said molten puddle on said workpiece.

* * * * *